(12) United States Patent
Barkan et al.

(10) Patent No.: US 12,153,651 B2
(45) Date of Patent: Nov. 26, 2024

(54) DEEP GRADIENT ACTIVATION MAP MODEL REFINEMENT

(71) Applicant: Microsoft Technology Licensing, LLC, Redmond, WA (US)

(72) Inventors: Oren Barkan, Rishon Lezion (IL); Omri Armstrong, Raanana (IL); Amir Hertz, Tel Aviv (IL); Avi Caciularu, Tel-Aviv (IL); Ori Katz, Tel-Aviv (IL); Itzik Malkiel, Givaatayim (IL); Noam Koenigstein, Tel-Aviv (IL); Nir Nice, Salit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 17/452,961

(22) Filed: Oct. 29, 2021

(65) Prior Publication Data

US 2023/0137744 A1 May 4, 2023

(51) Int. Cl.
*G06F 18/21* (2023.01)
*G06F 18/213* (2023.01)
(Continued)

(52) U.S. Cl.
CPC .......... *G06F 18/217* (2023.01); *G06F 18/213* (2023.01); *G06N 3/08* (2013.01); *G06V 10/462* (2022.01)

(58) Field of Classification Search
CPC ....... G06F 18/217; G06F 18/213; G06N 3/08; G06N 3/0464; G06N 3/048; G06N 3/045; G06V 10/462; G06V 10/82
(Continued)

(56) References Cited

U.S. PATENT DOCUMENTS

| 10,262,229 B1* | 4/2019 | Rao ...................... G06V 10/454 |
| 2015/0170005 A1* | 6/2015 | Cohen ................... G06F 16/583 |
| | | 382/180 |

(Continued)

OTHER PUBLICATIONS

Barkan, et al., "GAM: Explainable Visual Similarity and Classification via Gradient Activation Maps", In Repository of arXiv:2109.00951v1, Sep. 2, 2021, 13 Pages.

(Continued)

*Primary Examiner* — Ali Bayat
(74) *Attorney, Agent, or Firm* — Holzer Patel Drennan

(57) ABSTRACT

A method of generating an aggregate saliency map using a convolutional neural network. Convolutional activation maps of the convolutional neural network model are received into a saliency map generator, the convolutional activation maps being generated by the neural network model while computing the one or more prediction scores based on unlabeled input data. Each convolutional activation map corresponds to one of the multiple encoding layers. The saliency map generator generates a layer-dependent saliency map for each encoding layer of the unlabeled input data, each layer-dependent saliency map being based on a summation of element-wise products of the convolutional activation maps and their corresponding gradients. The layer-dependent saliency maps are combined into the aggregate saliency map indicating the relative contributions of individual components of the unlabeled input data to the one or more prediction scores computed by the convolutional neural network model on the unlabeled input data.

17 Claims, 5 Drawing Sheets

(51) Int. Cl.
*G06N 3/08* (2023.01)
*G06V 10/46* (2022.01)

(58) Field of Classification Search
USPC .......................................................... 382/156
See application file for complete search history.

(56) References Cited

U.S. PATENT DOCUMENTS

| | | | |
|---|---|---|---|
| 2018/0181593 A1* | 6/2018 | Ranzinger | G06V 10/82 |
| 2018/0204088 A1* | 7/2018 | Chen | G06V 10/776 |
| 2018/0300848 A1* | 10/2018 | Kuzyakov | G06V 20/30 |
| 2022/0092332 A1* | 3/2022 | Kuzyakov | G06V 20/20 |
| 2022/0100054 A1* | 3/2022 | Galor Gluskin | H04N 23/695 |

OTHER PUBLICATIONS

"International Search Report and Written Opinion Issued in PCT Application No. PCT/US22/045596", Mailed Date: Jan. 19, 2023, 11 Pages.

\* cited by examiner

DEEP GRADIENT ACTIVATION MAP MODEL REFINEMENT

BACKGROUND

An activation map for a deep neural network indicates regions of an input image, signal, etc. that activate a filter in the neural network. Traditional feature-based machine learning systems assign and optimize weights for interpretable explicit features that may be detected within the input. As such, such filters are used to decide whether a particular feature is detected within the input, and the activation map presents a vectorial representation of such detected features and their positions with respect to the input.

For example, a convolutional neural network can employ filters corresponding to possible features (e.g., parts of alphanumeric characters, eyes of a person) that can be detected in an image. The filters "slide" across the input image, outputting a measurement of how well each filter (e.g., for the eye) matches the pixels at each filter positioned within the image. An activation map is a form of this measurement, mapping filter locations to how well the group of local pixels at each filter position match the filter parameters for the corresponding feature. However, the complexity of such neural networks makes it challenging to understand how individual pixels and regions impact the results of the decision tasks, such as classification tasks and similarity tasks.

SUMMARY

The described technology provides a computing processor-based method of generating an aggregate saliency map using a convolutional neural network, wherein the convolutional neural network model includes multiple encoding layers. Convolutional activation maps of the convolutional neural network model are received into a saliency map generator, the convolutional activation maps being generated by the neural network model while computing the one or more prediction scores based on unlabeled input data. Each convolutional activation map corresponds to one of the multiple encoding layers. The saliency map generator generates a layer-dependent saliency map for each encoding layer of the unlabeled input data, each layer-dependent saliency map being based on a summation of element-wise products of the convolutional activation maps and their corresponding gradients. The layer-dependent saliency maps are combined into the aggregate saliency map indicating the relative contributions of individual components of the unlabeled input data to the one or more prediction scores computed by the convolutional neural network model on the unlabeled input data.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
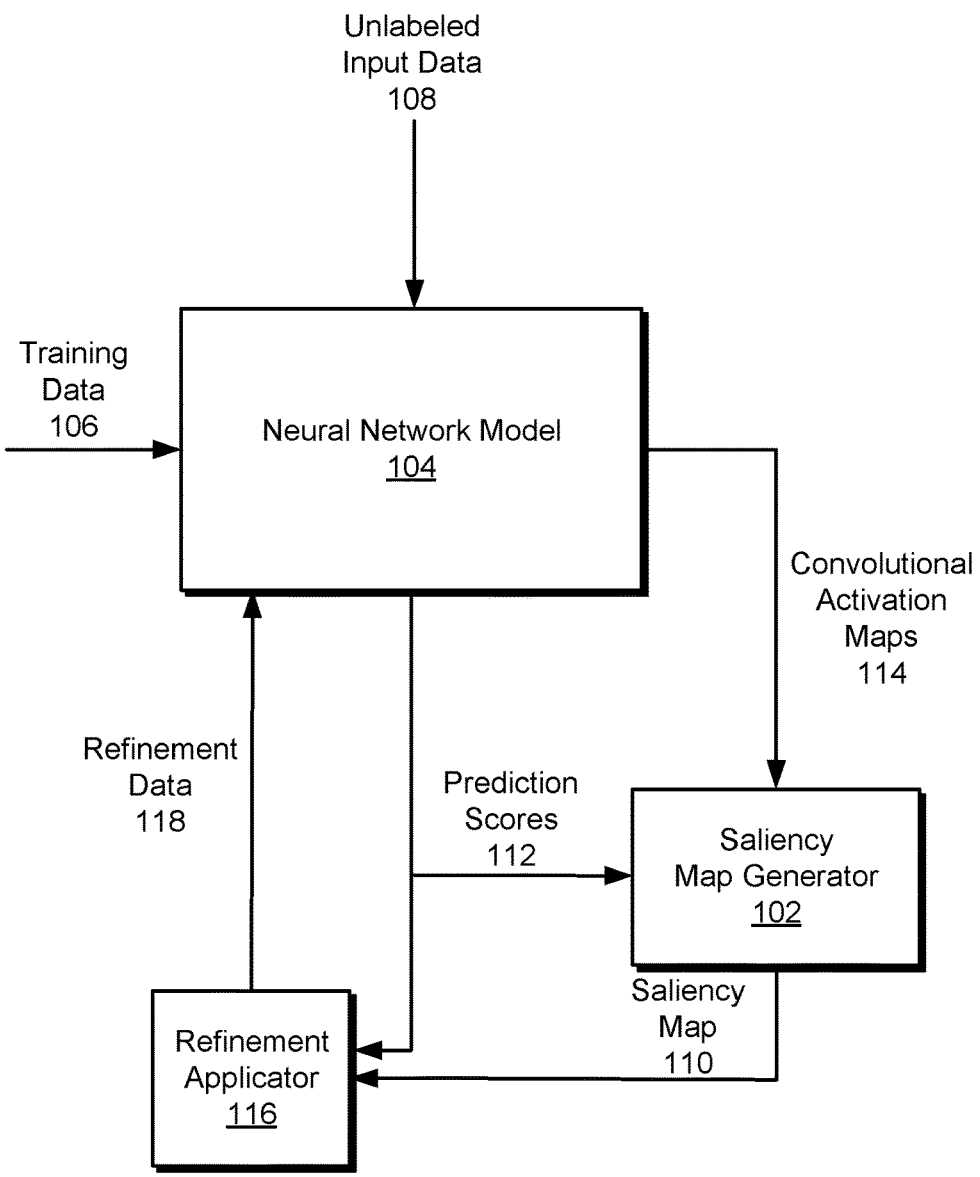
FIG. 1 illustrates an example machine learning system using feature recognition with an example saliency map generator providing a saliency map for deep gradient activation map model refinement.

A convolutional activation map or feature map for a deep neural network can be used to identify how important specific regions of an input image, frame, signal, etc. were to a prediction generated by a neural network. At inference, such activation maps can be evaluated in combination with resulting prediction scores to rank the importance of each pixel or region to the neural network's decision-making. For example, for a neural network tasked with identifying a breed of dog shown in an image, pixels in the regions of the dog's eyes, nose, mouth, ears, and tail would typically be more important to the breed identification than pixels in the background in the image.

Using a combination of convolutional activation maps and the resulting prediction scores from a deep neural network model, the described technology can generate one or more saliency maps. A saliency map depicts the relative contributions of each pixel in the input image with respect to the neural network model's resulting prediction. Pixels with a higher relative contribution to the prediction as compared to other pixels are deemed more important than the other pixels. Accordingly, a saliency map can be considered a type of heatmap that can be overlaid on an original image to provide an understanding of why the deep neural network model predicted a specific label for the image and which regions of the image had the largest impact on that prediction.

In order to better understand how the deep neural network model is working for a particular task, one can probe the model's performance through the evaluation of lower-level components in the model. The described technology provides a sophisticated improvement over past model evaluation techniques with interpretation and model refinement methods that probe the activation maps of a feature-based model and the gradients of each prediction score with respect to the activation maps used to generate the prediction score. Using the described technology, the improvements over previous approaches may include, without limitation:
- evaluating model performance during inference, rather than during training;
- analyzing convolutional activation maps from multiple layers of the model;
- operating in a self-supervised manner;
- analyzing a finetuned feature-based model without training an additional extractor network; and
- yielding faithful rationales of a model's performance independent of the decision task performed.

By interpreting the model's performance during inference, a system can refine the model, such as by supplementing/refining training data supplied to the model. For example, if a model incorrectly predicts that an input image of a person in Halloween makeup includes a cat, it is likely that the model was heavily influenced by pixels in the regions of the subject's eyes, nose, and ears when generating the incorrect prediction—e.g., the importance of pixels determined to include those features can be ranked high by a saliency map generator. Accordingly, a refinement applicator can supply similar training data (e.g., training data that includes variations of Halloween makeup and real cat eyes/noses/ears) to reinforce the correct manner in which those features should be interpreted by the model.

FIG. 1 illustrates an example machine learning system 100 using feature recognition with an example saliency map generator 102 providing a saliency map for deep gradient activation map model refinement. In this description, the input is in the form of an image, although other inputs, such as a 2D time-domain or frequency domain signal, may be employed. As such, in this example, the input is an image denoted by $x \in \mathbb{R}^{c_0 \times u_0 \times v_0}$ where $1 \leq l \leq L$. Note that $h_x^l$ is not necessarily produced by a plain convolutional layer but can be the output of a more complex function, such as a residual or DenseNet block. The k-th activation map in $h_x^l$ is denoted as $h_x^{lk} \triangleq h_x^l[k] (\in \mathbb{R}^{u_l \times v_l})$.

Let $f: \mathbb{R}^{c_L \times u_L \times v_L} \to \mathbb{R}^d$ be a function that maps 3D tensors to a d-dimensional vector representation. The mapping of the last activation maps $h_x^L$ as $f_x \triangleq f(h_x^L) \in \mathbb{R}^d$. Note that $f$ may vary between different network architectures. Usually, $f$ consists of a (channel-wise) global average pooling layer that is optionally followed by subsequent fully connected (FC) layers.

Further, let s: $\mathbb{R}^d \times \mathbb{R}^d \to \mathbb{R}$ be a scoring function that receives two vectors and outputs a score. The use of s varies between tasks, such as classification and similarity. In classification tasks, $f$ represents the last hidden layer of the network. The logit score for the class j is computed by $s(f_x, w_j)$, where $w_j \in \mathbb{R}^d$ is the weights vector associated with the class j. In multiclass (multilabel) classification, s is usually set to the dot-product, optionally with bias correction, or the cosine similarity. Then, either a softmax (sigmoid) function, with some temperature, transfers s values to the range [0,1].

For similarity tasks, two images x, $y \in \mathbb{R}^{c_0 \times u_0 \times v_0}$ and a similarity score $s(f_x, f_y)$ are considered. One approach is to set s to the dot-product or cosine similarity. Further note that in the specific case of similarity, the representation produced by $f$ is not necessarily taken from the last hidden layer of the network. Therefore, $f$ can be set to the output from any FC layer. For the sake of brevity, from here onward, both $s(f_x, w_j)$ and $s(f_x, f_y)$ are abbreviated as s. Disambiguation will be clear from the context.

In the illustrated machine learning system 100, a neural network model 104 (e.g., a feature-based neural network) is a convolutional neural network (CNN) and is trained based on training data 106 (e.g., labeled images). After training (and/or independent of training) of the neural network model 104, unlabeled input data 108 (e.g., defined as x) is input to the neural network model 104 to perform a processing task, such as a classification task of identifying an object in the image or determining a similarity between two images. The neural network model 104 generates prediction scores 112 (e.g., predicting whether a given object is in the image or whether two images share similar objects). While generating the prediction scores 112, the neural network model 104 also generates convolutional activation maps for each of its encoding layers.

The prediction scores 112 and the convolutional activation maps 114 are input to the saliency map generator 102, which generates a saliency map 110. As previously described, a salience map 110 (denoted as $z_x^n \triangleq z(M, n)$) depicts the relative contribution of each pixel in an input image with respect to the prediction scores 112.

Given the model-specific saliency map 110 associated with operation of the neural network model 104 on the unlabeled input data 108 and the resulting prediction scores 112), a refinement applicator 116 provides refinement data 118 to the neural network model 104 to improve its performance. In one example, an incorrect prediction can be flagged such that the refinement application 116 can supply new training data to the neural network model 104 to improve its performance. The new training data can be collected around the features corresponding to pixels of greater importance identified by the saliency map 110. In other implementations, changes in the design of the neural network model and/or pre-filtering of unlabeled input data, as suggested by the saliency map 110, may be appropriate for improving the performance of the model.

Figure 2:
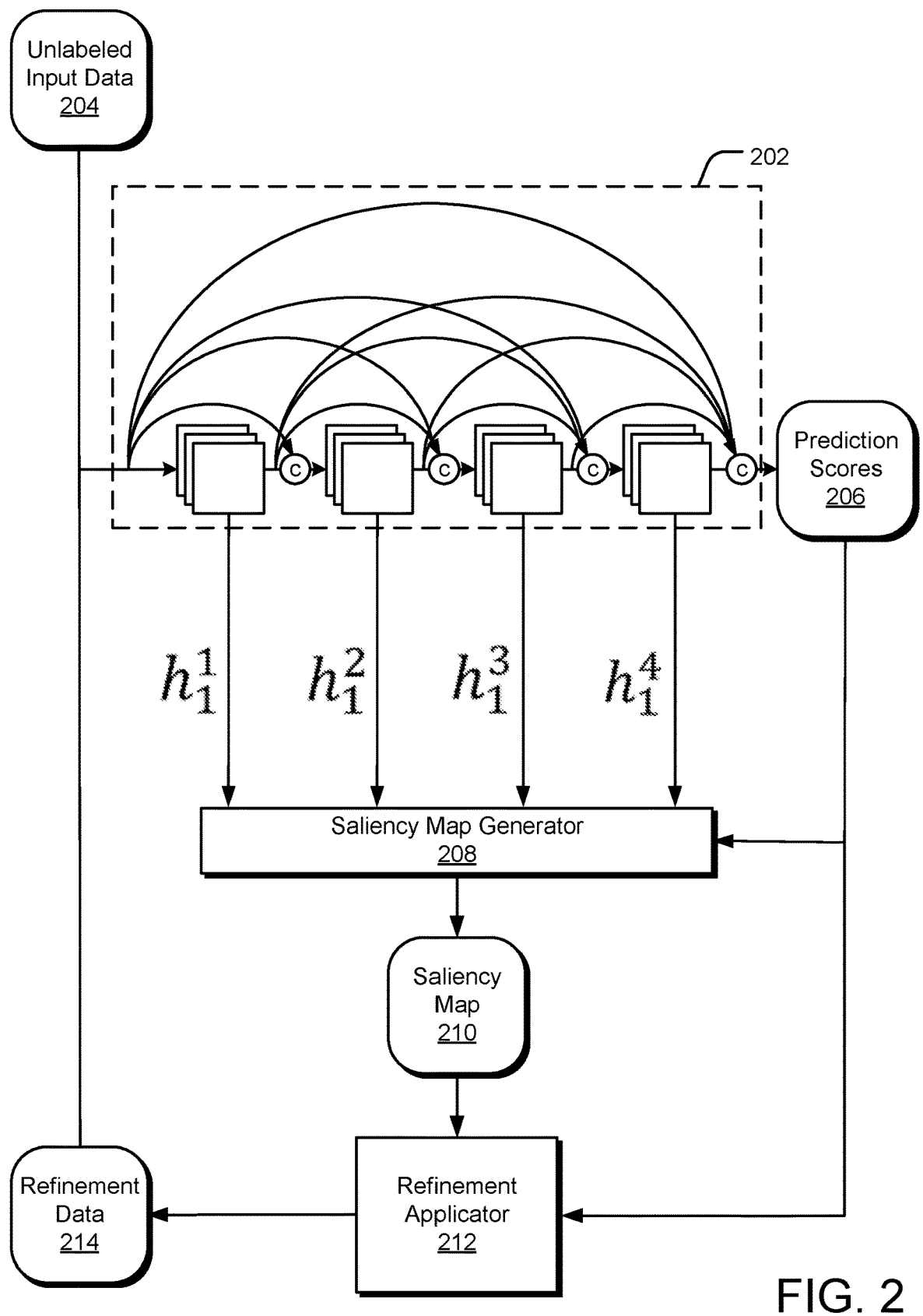
FIG. 2 illustrates an example neural network system used with deep gradient activation map model refinement.

FIG. 2 illustrates an example machine learning system 200 used with deep gradient activation map model refinement. The machine learning system 200 includes a four-encoder-layer neural network model 202 as an example, although the number of encoder layers may vary. Furthermore, the first three encoder layers starting from the left are referred to as a "backbone network," and the right-most encoder layer is referred to as a "prediction head." Typically, the prediction head is devoted to a particular processing task (e.g., multiclass/binary classification, a similarity task), and a given machine learning model may include different heads for different tasks. In FIG. 2, it is assumed that the four-encoder-layer neural network model 202 has already been at least partially trained. Unlabeled input data 204 (e.g., one or more images) is input to the four-encoder-layer neural network model 202 and propagates through the layers of the convolutional neural network model. As a result, the four-encoder-layer neural network model 202 generates the prediction scores 206 (s).

The convolutional activation maps $h_x^l$ and their corresponding prediction scores 206 are output from the four-encoder-layer neural network model 202 and input to a saliency map generator 208. Given an image x, the l-th saliency map $m_x^l \in \mathbb{R}^{u_0 \times v_0}$ is denoted by: $m_x^l \triangleq m(h_x^l, g_x^l)$, which is a function of the convolutional activation maps $h_x^l$ and their gradients:

$$g_x^l \triangleq \frac{\partial s}{\partial h_x^l}.$$

Also, $g_x^{lk} \triangleq g_x^l[k]$ (similarly to the notation $h_x^{lk}$). Then, the level-dependent saliency maps $m(h_x^l, g_x^l)$ are defined according to $$m(h_x^l, g_x^l) = NRM[RSZ[\Sigma_{k=1}^{c_l} \phi(h_x^{lk}) \circ \phi(g_x^{lk})]], \tag{1}$$

where $\phi$ is the ReLU activation function, and $\circ$ is the Hadamard or element-wise product. RSZ denotes the operation of resizing to a matrix of size $u_0 \times v_0$ (the height and width of the original image x). NRM denotes the min-max normalization.

A motivation behind Eq. (1) is as follows: each filter k in the l-th convolutional layer captures a specific pattern (e.g., a feature). Therefore, one expects $h_x^{lk}$ to have high (low) values in regions that do (not) correlate with the k-th filter. In addition, regions in $g_x^{lk}$ that receive positive (negative) values indicate that increasing the value of the same regions in $h_x^{lk}$ will increase (decrease) s value.

The described technology highlights pixels that are both positively activated and associated with positive gradients. To this end, negative gradients are truncated (using ReLU). Further, negative values in the activation map $h_x^{lk}$ are also truncated and multiplied (element-wise) by the truncated gradient map. This approach causes only pixels associated with both positive activation and gradients to be preserved, omitting pixels that do not meet these conditions. The saliency maps are then summed across the channel (filter) axis to aggregate saliency per pixel from all channels in the l-th layer. The l-th saliency map $m_x^l$ is obtained by resizing (via bi-cubic interpolation) to the original image spatial dimensions followed by min-max normalization. This process produces a set of L saliency maps $M=\{m_x^l\}_{l=1}^{L}$.

Accordingly, the saliency map generator 208 convolutional activation maps $h_x^l$ and their corresponding prediction scores 206 and generates the layer-dependent saliency maps $m_x^l$ for each layer and an aggregate saliency map 210. The aggregate saliency map 210 ($z_x^n \triangleq z(M, n)$) is computed based on a function z that aggregates the information from the layer-dependent saliency maps produced by last n layers. In one implementation, the aggregate saliency map z is implemented as follows:

$$z(M, n) = \frac{1}{n} \sum_{l=L-n+1}^{L} m_x^l. \quad (2)$$

Different implementations of z, such as max-pooling, Hadamard product, or various weighted combinations of M may be employed instead of the summation provided in Eq. (2), but Eq. (2), appears to generate the best results on the input data used so far. Nevertheless, the other implementations, including the effect of different n values on the final saliency map $z_x^n$, are contemplated.

The described technology can provide technical improvements over other techniques. Some of those technical improvements are discussed below.

Gradient Localization: The described technology preserves (positive) gradient localization via the element-wise multiplication $\phi(g_x^{lk})$.

Multi-layer Analysis: The described technology extracts information from earlier layers or blocks in the neural network model 104. Incorporating information from earlier blocks (e.g., setting n>1) enables the described technology to produce fine-grained saliency maps that are more focused on the relevant objects than in other approaches.

Negative Gradients Suppression: The descried technology applies the $\phi$ (ReLU) operation in a manner that intensifies the importance of pixels or regions of the input rather than reduces their importance. Consider a pixel (i, j) in a region that contributes to the final score s. Ideally, this pixel is to be intensified in the final saliency map. By its nature, such a pixel in an "important" region is expected to have positive (pooled) gradient values and positive activation values across several filters. However, it is also possible that some other filters that respond with a small yet positive activation will be associated with negative (pooled) gradients values in other approaches. As such, the described technology applies $\phi$ to the gradients $g_x^{lk}$ before the multiplication by the activation maps $h_x^{lk}$ (Eq. (1)), thereby causing negative gradients to be zeroed and hence to not (negatively) affect the region's intensity on other channels or layers. Thus, regions with positive gradients are not masked by $\phi$ and are "correctly" intensified according to the magnitudes of the positive gradients and activations. In summary, by suppressing negative gradients in advance, the described technology produces adequate saliency maps.

A ground truth process is a term used in statistics and machine learning that means checking the results of machine learning for accuracy against the real world. The accuracy of the prediction scores 206 can depend on the performance of the four-encoder-layer neural network model 202, which can be limited at least by its design and/or training. Accordingly, the ground truth can be used to identify prediction errors in the output of the four-encoder-layer neural network model 202, but this process does not provide a robust understanding of why the errors were generated or how to improve the performance of the model.

Accordingly, the described technology explains the predictions made by the four-encoder-layer neural network model 202 using activation maps together with their respective gradients in order to produce a ranking over the pixels in x such that pixels that affect the model's prediction the most are ranked higher. This ranking is embodied in the aggregate saliency map 210.

Having computed the aggregate saliency map 210, the machine learning system 200 can input the aggregate saliency map 210 into a refinement applicator 212 to generate refinement data 214, which can be used to refine the four-encoder-layer neural network model 202. In one implementation, for example, the refinement data 214 may include supplemental training data that is focused on objects correctly identified in the higher ranking pixels/regions of the image x in the unlabeled input data 204. By training the four-encoder-layer neural network model 202 with training data that provides correct labeling based on these higher-ranking pixels/regions, the model can improve its accuracy for future predictions. In another implementation, the refinement data 214 may provide insight into redesigning the four-encoder-layer neural network model 202, such as by adding or subtracting layers, incorporating different prediction heads for a given task, etc.

Figure 3:
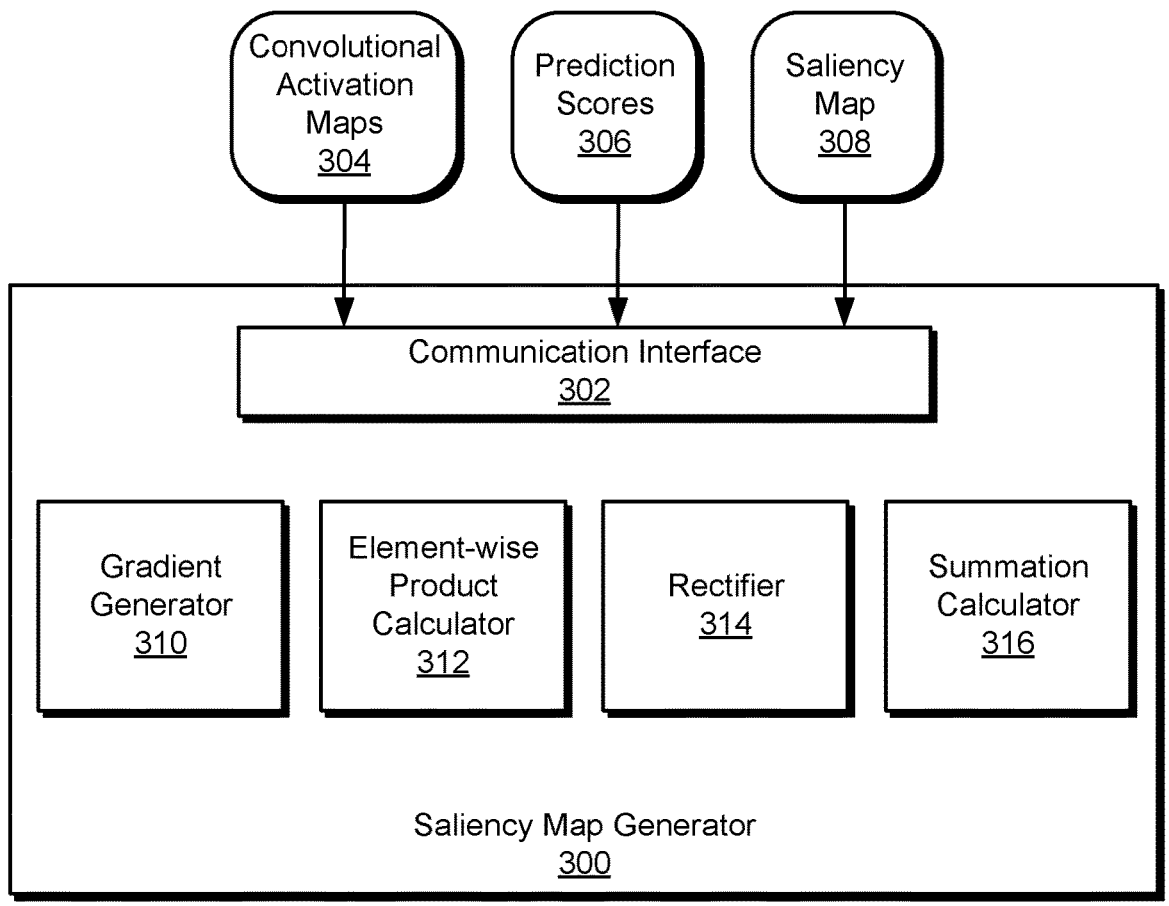
FIG. 3 illustrates an example saliency map generator for indicating pixel or region importance for deep gradient activation map model refinement relative to a neural network system.

FIG. 3 illustrates an example saliency map generator 300 for indicating pixel or region importance for deep gradient activation map model refinement relative to a neural network system. The saliency map generator 300 includes one or more communication interfaces (see a communication interface 302), which may be implemented in software and/or hardware and configured to receive convolutional activation maps 304, such as from a convolutional neural network model, and corresponding prediction scores 306 and to output an aggregate saliency map 308, such as to a refinement applicator.

Calculating elements of the saliency map generator 300 may include without limitation a gradient generator 310, an element-wise product calculator 312, a rectifier 314, and a summation calculator 316. The gradient generator 310 is executable by one or more computing hardware processors to generate gradients of the prediction scores across the activation maps. In one implementation, the gradients are calculated according to:

$$g_x^l \triangleq \frac{\partial s}{\partial h_x^l},$$

although other gradient calculations may be employed in other implementations.

In one implementation, the element-wise product calculator 312 computes the Hadamard (or element-wise) product of the activation maps and the ReLU of the element-wise gradients, as shown in Eq. 3. Alternative implementations of the element-wise product calculator may be employed.

In at least one implementation, the rectifier 314 computes the ReLU function on the gradients generated by the gradient generator 310. The summation calculator 316 computes the summations given in Eq. (3), and variations thereof, to yield the aggregate saliency map 308 (e.g., z).

Figure 4:
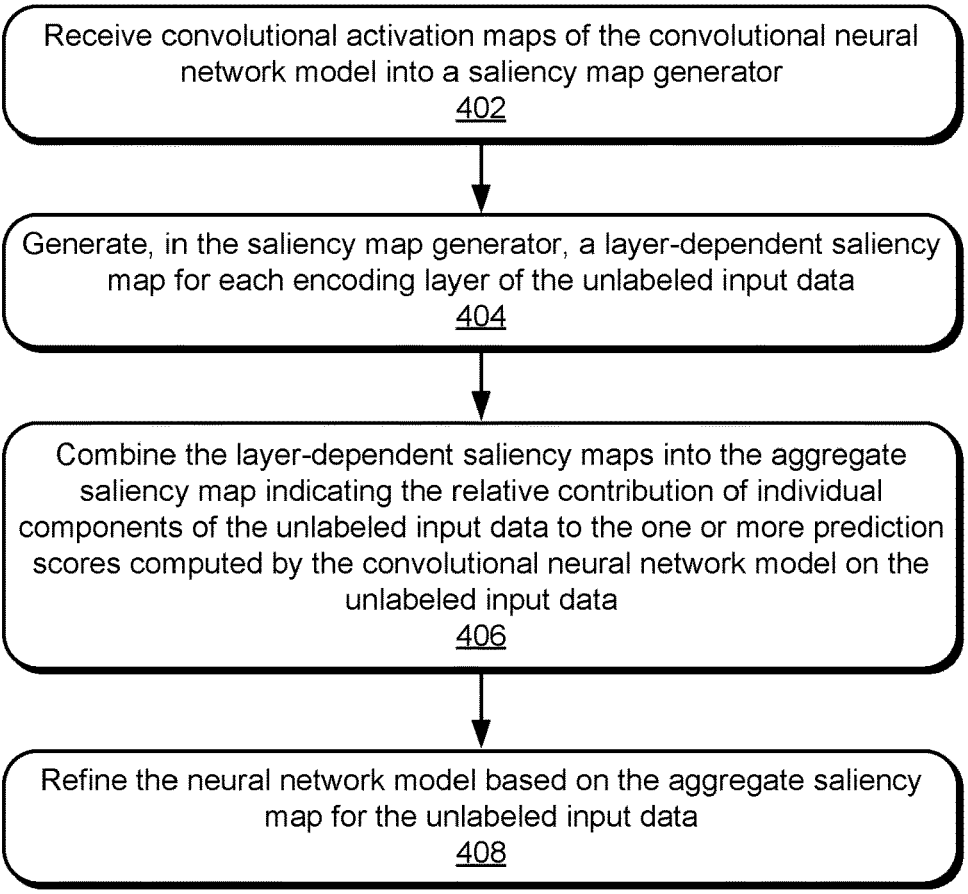
FIG. 4 illustrates example operations for indicating pixel or region importance for deep gradient activation map model refinement relative to a neural network system.

FIG. 4 illustrates example operations 400 for indicating pixel or region importance for deep gradient activation map model refinement relative to a neural network system. The example operations 400 generate an aggregate saliency map using a convolutional neural network. The convolutional neural network model includes multiple encoding layers. A receiving operation 402 receives convolutional activation maps of the convolutional neural network model into a saliency map generator. The convolutional activation maps are generated by the convolutional neural network model while computing the one or more prediction scores based on the unlabeled input data and then input to the saliency map generator. Each convolutional activation map corresponds to one of the multiple encoding layers A generating operation 404 generate, in the saliency map generator, a layer-dependent saliency map for each encoding layer of the unlabeled input data. Each layer-dependent saliency map is based on a summation of element-wise products of the convolutional activation maps and their corresponding gradients.

A combining operation 406 combines the layer-dependent saliency maps into the aggregate saliency map indicating the relative contribution of individual components of the unlabeled input data to the one or more prediction scores computed by the convolutional neural network model on the unlabeled input data.

A refining operation 408 refines the convolutional neural network model based on the aggregate saliency map for the unlabeled input data. In one implementation, the refining operation 408 may generate and/or input supplemental training data into the machine learning model, wherein the supplemental training data is substantially focused on tokens that rank highly in the aggregate saliency map. Other refinements may include refinements to the design of the machine learning model (e.g., adding/subtracting encoding layers).

Figure 5:
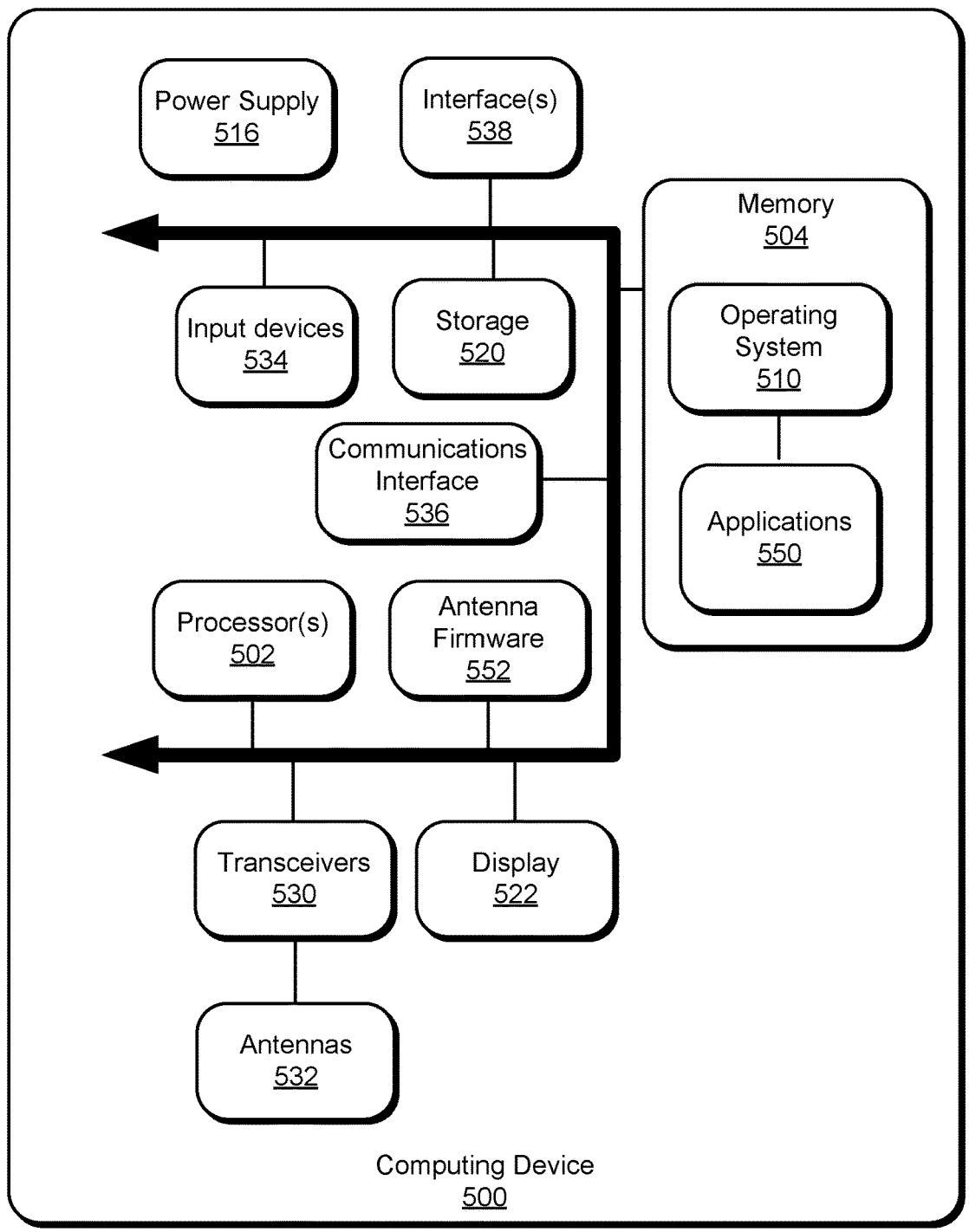
FIG. 5 illustrates an example computing device for use in refining a neural network system.

FIG. 5 illustrates an example computing device 500 in a computing system for use in refining a neural network system. The computing device 500 may be a client device, such as a laptop, mobile device, desktop, tablet, or a server/cloud device. The computing device 500 includes one or more processor(s) 502, and a memory 504. The memory 504 generally includes both volatile memory (e.g., RAM) and non-volatile memory (e.g., flash memory). An operating system 510 resides in the memory 504 and is executed by the processor(s) 502.

In an example computing device 500, as shown in FIG. 5, one or more modules or segments, such as applications 550, a machine learning model, a saliency map generator, a refinement applicator, all or part of a communication interface, a gradient generator, an element-wise product calculator, a rectifier, a summation calculator, and other modules, are loaded into the operating system 510 on the memory 504 and/or storage 520 and executed by processor(s) 502. The storage 520 may store prediction scores, unlabeled input data, training data, saliency maps, convolutional activation maps, and other data and be local to the computing device 500 or may be remote and communicatively connected to the computing device 500.

The computing device 500 includes a power supply 516, which is powered by one or more batteries or other power sources and which provides power to other components of the computing device 500. The power supply 516 may also be connected to an external power source that overrides or recharges the built-in batteries or other power sources.

The computing device 500 may include one or more communication transceivers 530 which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a network adapter 536, which is a type of communication device. The computing device 500 may use the adapter and any other types of communication devices for establishing connections over a wide-area network (WAN) or local-area network (LAN). It should be appreciated that the network connections shown are exemplary and that other communications devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538, such as a serial port interface, parallel port, or universal serial bus (USB). The computing device 500 may further include a display 522, such as a touch screen display.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example computing processor-based method of generating an aggregate saliency map using a convolutional neural network model is provided. The convolutional neural network model includes multiple encoding layers. The example computing processor-based method includes receiving convolutional activation maps of the convolutional neural network model into a saliency map generator, the convolutional activation maps being generated by the convolutional neural network model while computing one or more prediction scores based on unlabeled input data. Each convolutional activation map corresponds to one of the multiple encoding layers. The saliency map generator generates a layer-dependent saliency map for each encoding layer of the unlabeled input data, each layer-dependent saliency map being based on a summation of element-wise products of the convolutional activation maps and their corresponding gradients. The layer-dependent saliency maps are combined into the aggregate saliency map indicating relative contributions of individual components of the unlabeled input data to the one or more prediction scores computed by the convolutional neural network model on the unlabeled input data.

Another example computing processor-based method of any preceding method is provided, wherein the individual components of the unlabeled input data include individual pixels.

Another example computing processor-based method of any preceding method further includes refining the convolutional neural network model based on the aggregate saliency map for the unlabeled input data.

Another example computing processor-based method of any preceding method is provided, wherein the combining operation includes summing the layer-dependent saliencies maps across at least a portion of the encoding layers in the convolutional neural network model.

Another example computing processor-based method of any preceding method is provided, wherein the summation is limited to the element-wise products of positive convolutional activation maps and their corresponding gradients, wherein negative convolutional activation maps are zeroed.

Another example computing processor-based method of any preceding method is provided, wherein the summation is limited to the element-wise products of the convolutional activation maps and their corresponding positive gradients, wherein negative gradients are zeroed.

Another example computing processor-based method of any preceding method is provided, wherein the summation is limited to the element-wise products of positive convolutional activation maps and their corresponding positive gradients, wherein negative convolutional activation maps and negative gradients are zeroed.

An example computing system for generating an aggregate saliency map using a convolutional neural network model is provided. The convolutional neural network model includes multiple encoding layers. The example computing system includes one or more hardware computing processors and a communication interface executable at least in part by the one or more hardware computing processors and configured to receive convolutional activation maps of the convolutional neural network model into a saliency map generator, the convolutional activation maps being generated by the convolutional neural network model while computing one or more prediction scores based on unlabeled input data, each convolutional activation map corresponding to one of the multiple encoding layers. The example computing system further includes a saliency map generator executable at least in part by the one or more hardware computing processors and configured to generate a layer-dependent saliency map for each encoding layer of the unlabeled input data, each layer-dependent saliency map being based on a summation of element-wise products of the convolutional activation maps and their corresponding gradients, the saliency map generator being further configured to combine the layer-dependent saliency maps into the aggregate saliency map indicating relative contributions of individual components of the unlabeled input data to the one or more prediction scores computed by the convolutional neural network model on the unlabeled input data.

Another example computing system of any preceding computing system is provided, wherein the individual components of the unlabeled input data include individual pixels.

Another example computing system of any preceding computing system further includes a refinement applicator executable by the one or more hardware computing processors and configured to refine the convolutional neural network model based on the aggregate saliency map for the unlabeled input data.

Another example computing system of any preceding computing system is provided, wherein the combining operation includes summing the layer-dependent saliencies maps across at least a portion of the encoding layers in the convolutional neural network model.

Another example computing system of any preceding computing system is provided, wherein the summation is limited to the element-wise products of positive convolutional activation maps and their corresponding gradients, wherein negative convolutional activation maps are zeroed.

Another example computing system of any preceding computing system is provided, wherein the summation is limited to the element-wise products of the convolutional activation maps and their corresponding positive gradients, wherein negative gradients are zeroed.

Another example computing system of any preceding computing system is provided, wherein the summation is limited to the element-wise products of positive convolutional activation maps and their corresponding positive gradients, wherein negative convolutional activation maps and negative gradients are zeroed.

One or more example tangible processor-readable storage media embodied with instructions for executing on one or more processors and circuits of a computing device a process for generating an aggregate saliency map using a convolutional neural network model is provided, wherein the convolutional neural network model includes multiple encoding layers, The process includes receiving convolutional activation maps of the convolutional neural network model into a saliency map generator, the convolutional activation maps being generated by the convolutional neural network model while computing one or more prediction scores based on unlabeled input data, each convolutional activation map corresponding to one of the multiple encoding layers. The process further includes generating, in the saliency map generator, a layer-dependent saliency map for each encoding layer of the unlabeled input data, each layer-dependent saliency map being based on a summation of element-wise products of the convolutional activation maps and their corresponding gradients. The process further includes combining the layer-dependent saliency maps into the aggregate saliency map indicating relative contributions of individual components of the unlabeled input data to the one or more prediction scores computed by the convolutional neural network model on the unlabeled input data.

Other one or more example tangible processor-readable storage media of any preceding media are provided, wherein the individual components of the unlabeled input data include individual pixels.

Other one or more example tangible processor-readable storage media of any preceding media are provided wherein the process further includes refining the convolutional neural network model based on the aggregate saliency map for the unlabeled input data.

Other one or more example tangible processor-readable storage media of any preceding media are provided, wherein the combining operation includes summing the layer-dependent saliencies maps across at least a portion of the encoding layers in the convolutional neural network model.

Other one or more example tangible processor-readable storage media of any preceding media are provided, wherein the summation is limited to the element-wise products of the convolutional activation maps and their corresponding positive gradients, wherein negative gradients are zeroed.

Other one or more example tangible processor-readable storage media of any preceding media are provided, wherein the summation is limited to the element-wise products of positive convolutional activation maps and their corresponding positive gradients, wherein negative convolutional activation maps and negative gradients are zeroed.

An example system for generating an aggregate saliency map using a convolutional neural network model is provided, wherein the convolutional neural network model includes multiple encoding layers. The example system includes means for receiving convolutional activation maps of the convolutional neural network model into a saliency map generator, the convolutional activation maps being generated by the convolutional neural network model while computing one or more prediction scores based on unlabeled input data, each convolutional activation map corresponding to one of the multiple encoding layers. The example system further includes means for generating, in the saliency map generator, a layer-dependent saliency map for each encoding layer of the unlabeled input data, each layer-dependent saliency map being based on a summation of element-wise products of the convolutional activation maps and their corresponding gradients. The example system further includes means for combining the layer-dependent saliency maps into the aggregate saliency map indicating relative contributions of individual components of the unlabeled input data to the one or more prediction scores computed by the convolutional neural network model on the unlabeled input data.

Another example system of any preceding system is provided, wherein the individual components of the unlabeled input data include individual pixels.

Another example system of any preceding system further includes refining the convolutional neural network model based on the aggregate saliency map for the unlabeled input data.

Another example system of any preceding system is provided, wherein the means for combining includes means for summing the layer-dependent saliencies maps across at least a portion of the encoding layers on the convolutional neural network.

Another example system of any preceding system is provided, wherein the summation is limited to the element-wise products of positive convolutional activation maps and their corresponding gradients, wherein negative convolutional activation maps are zeroed.

Another example system of any preceding system is provided, wherein the summation is limited to the element-wise products of the convolutional activation maps and their corresponding positive gradients, wherein negative gradients are zeroed.

Another example system of any preceding system is provided, wherein the summation is limited to the element-wise products of positive convolutional activation maps and their corresponding positive gradients, wherein negative convolutional activation maps and negative gradients are zeroed.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A computing processor-based method of generating an aggregate saliency map using a convolutional neural network model, wherein the convolutional neural network model includes multiple encoding layers, the computing processor-based method comprising:

receiving convolutional activation maps of the convolutional neural network model into a saliency map generator, the convolutional activation maps being generated by the convolutional neural network model while computing one or more prediction scores based on unlabeled input data, each convolutional activation map corresponding to one of the multiple encoding layers;

generating, in the saliency map generator, a layer-dependent saliency map for each encoding layer of the unlabeled input data, each layer-dependent saliency map being based on a summation of element-wise products of the convolutional activation maps and their corresponding gradients;

combining the layer-dependent saliency maps into the aggregate saliency map indicating relative contributions of individual components of the unlabeled input data to the one or more prediction scores computed by the convolutional neural network model on the unlabeled input data; and refining the convolutional neural network model based on the aggregate saliency map for the unlabeled input data.

2. The computing processor-based method of claim 1, wherein the individual components of the unlabeled input data include individual pixels.

3. The computing processor-based method of claim 1, wherein the combining operation comprises:

summing the layer-dependent saliencies maps across at least a portion of the encoding layers in the convolutional neural network model.

4. The computing processor-based method of claim 1, wherein the summation is limited to the element-wise products of positive convolutional activation maps and their corresponding gradients, wherein negative convolutional activation maps are zeroed.

5. The computing processor-based method of claim 1, wherein the summation is limited to the element-wise products of the convolutional activation maps and their corresponding positive gradients, wherein negative gradients are zeroed.

6. The computing processor-based method of claim 1, wherein the summation is limited to the element-wise products of positive convolutional activation maps and their corresponding positive gradients, wherein negative convolutional activation maps and negative gradients are zeroed.

7. A computing system for generating an aggregate saliency map using a convolutional neural network model, wherein the convolutional neural network model includes multiple encoding layers, the computing system comprising:

one or more hardware computing processors;

a communication interface executable at least in part by the one or more hardware computing processors and configured to receive convolutional activation maps of the convolutional neural network model, the convolutional activation maps being generated by the convolutional neural network model while computing one or more prediction scores based on unlabeled input data, each convolutional activation map corresponding to one of the multiple encoding layers;

a saliency map generator executable at least in part by the one or more hardware computing processors and configured to generate a layer-dependent saliency map for each encoding layer of the unlabeled input data, each layer-dependent saliency map being based on a summation of element-wise products of the convolutional activation maps and their corresponding gradients, the saliency map generator being further configured to combine the layer-dependent saliency maps into the aggregate saliency map indicating relative contributions of individual components of the unlabeled input data to the one or more prediction scores computed by the convolutional neural network model on the unlabeled input data; and a refinement applicator executable by the one or more hardware computing processors and configured to refine the convolutional neural network model based on the aggregate saliency map for the unlabeled input data.

8. The computing system of claim 7, wherein the individual components of the unlabeled input data include individual pixels.

9. The computing system of claim 7, wherein the combining operation comprises:

summing the layer-dependent saliencies maps across at least a portion of the encoding layers on the convolutional neural network model.

10. The computing system of claim 7, wherein the summation is limited to the element-wise products of positive convolutional activation maps and their corresponding gradients, wherein negative convolutional activation maps are zeroed.

11. The computing system of claim 7, wherein the summation is limited to the element-wise products of the convolutional activation maps and their corresponding positive gradients, wherein negative gradients are zeroed.

12. The computing system of claim 7, wherein the summation is limited to the element-wise products of positive convolutional activation maps and their corresponding positive gradients, wherein negative convolutional activation maps and negative gradients are zeroed.

13. One or more tangible processor-readable storage media embodied with instructions for executing on one or more processors and circuits of a computing device a process for generating an aggregate saliency map using a convolutional neural network model, wherein the convolutional neural network model includes multiple encoding layers the process comprising:

receiving convolutional activation maps of the convolutional neural network model into a saliency map generator, the convolutional activation maps being generated by the convolutional neural network model while computing one or more prediction scores based on unlabeled input data, each convolutional activation map corresponding to one of the multiple encoding layers;

generating, in the saliency map generator, a layer-dependent saliency map for each encoding layer of the unlabeled input data, each layer-dependent saliency map being based on a summation of element-wise products of the convolutional activation maps and their corresponding gradients;

combining the layer-dependent saliency maps into the aggregate saliency map indicating relative contributions of individual components of the unlabeled input data to the one or more prediction scores computed by the convolutional neural network model on the unlabeled input data; and refining the convolutional neural network model based on the aggregate saliency map for the unlabeled input data.

14. The one or more tangible processor-readable storage media of claim 13, wherein the individual components of the unlabeled input data include individual pixels.

15. The one or more tangible processor-readable storage media of claim 13, wherein the combining operation comprises:

summing the layer-dependent saliencies maps across at least a portion of the encoding layers in the convolutional neural network model.

16. The one or more tangible processor-readable storage media of claim 13, wherein the summation is limited to the element-wise products of the convolutional activation maps and their corresponding positive gradients, wherein negative gradients are zeroed.

17. The one or more tangible processor-readable storage media of claim 13, wherein the summation is limited to the element-wise products of positive convolutional activation maps and their corresponding positive gradients, wherein negative convolutional activation maps and negative gradients are zeroed.

* * * * *